(12) United States Patent
Koivusalmi et al.

(10) Patent No.: US 7,888,542 B2
(45) Date of Patent: Feb. 15, 2011

(54) PROCESS FOR PRODUCING A SATURATED HYDROCARBON COMPONENT

(75) Inventors: Eija Koivusalmi, Kulloonkylä (FI); Jukka Myllyoja, Vantaa (FI); Jorma Matikainen, Helsinki (FI)

(73) Assignee: Neste Oil Oyj, Espoo (FI)

( * ) Notice: Subject to any disclaimer, the term of this patent is extended or adjusted under 35 U.S.C. 154(b) by 908 days.

(21) Appl. No.: 11/637,159

(22) Filed: Dec. 12, 2006

(65) Prior Publication Data

US 2007/0131579 A1  Jun. 14, 2007

Related U.S. Application Data

(60) Provisional application No. 60/749,033, filed on Dec. 12, 2005.

(51) Int. Cl.
*C07C 1/20* (2006.01)
*C07C 1/207* (2006.01)
*C07C 1/213* (2006.01)

(52) U.S. Cl. .................. 585/327; 585/326; 585/329; 585/330

(58) Field of Classification Search ................ 585/327, 585/326, 329, 330
See application file for complete search history.

(56) References Cited

U.S. PATENT DOCUMENTS

| | | | |
|---|---|---|---|
| 3,182,017 | A | 5/1965 | Fleck |
| 3,242,080 | A | 3/1966 | Wiley et al. |
| 3,444,143 | A | 5/1969 | Morris |
| 3,501,546 | A | 3/1970 | Dubeck et al. |
| 4,026,960 | A | 5/1977 | Nishida et al. |
| 4,133,841 | A | 1/1979 | Cosyns |
| 4,299,979 | A | 11/1981 | Murphy |
| 4,317,948 | A | 3/1982 | Heckelsberg |
| 4,457,944 | A | 7/1984 | Conrad et al. |
| 4,744,884 | A | 5/1988 | Moorehead |
| 4,783,274 | A | 11/1988 | Jokinen et al. |
| 5,333,698 | A | 8/1994 | Van Slyke |
| 5,416,239 | A | 5/1995 | Westfechtel et al. |
| 5,444,170 | A | 8/1995 | Vedage |
| 5,516,960 | A | 5/1996 | Robinson |
| 5,705,722 | A | 1/1998 | Monnier |
| 5,719,097 | A | 2/1998 | Chang |
| 6,245,725 | B1 | 6/2001 | Tanaka et al. |

(Continued)

FOREIGN PATENT DOCUMENTS

DE  1024238  11/1956

(Continued)

OTHER PUBLICATIONS

Translation of Search Report of FI-20055661 dated May 12, 2006.

(Continued)

*Primary Examiner*—Thuan Dinh Dang
(74) *Attorney, Agent, or Firm*—Birch, Stewart, Kolasch and Birch, LLP (57) ABSTRACT

The invention relates to a process for producing high-quality saturated base oil or a base oil component based on hydrocarbons. The process of the invention comprises two main steps, the oligomerization and deoxygenation. A biological starting material containing unsaturated carboxylic acids and/or esters of carboxylic acids is preferably used as the feedstock.

17 Claims, 2 Drawing Sheets

U.S. PATENT DOCUMENTS

| | | | |
|---|---|---|---|
| 6,562,230 | B1 | 5/2003 | O'Rear et al. |
| 6,599,864 | B1 | 7/2003 | Bertomeu |
| 6,683,224 | B1 | 1/2004 | Hourticolon et al. |
| 6,703,356 | B1 | 3/2004 | Wu |
| 2002/0062055 | A1 | 5/2002 | Raulo et al. |
| 2003/0181769 | A1 | 9/2003 | Both et al. |
| 2004/0002620 | A1 | 1/2004 | Schwerin et al. |
| 2004/0053796 | A1 | 3/2004 | O'Rear |
| 2004/0055209 | A1 | 3/2004 | Jakkula |
| 2004/0099571 | A1 | 5/2004 | Germaine et al. |
| 2004/0230085 | A1 | 11/2004 | Jakkula |
| 2005/0077209 | A1 | 4/2005 | Miller et al. |
| 2005/0133408 | A1 | 6/2005 | Abernathy et al. |
| 2005/0241990 | A1 | 11/2005 | Ziemer et al. |
| 2006/0027486 | A1 | 2/2006 | Rosenbaum et al. |

FOREIGN PATENT DOCUMENTS

| | | |
|---|---|---|
| DE | 1024238 | 11/1958 |
| DE | 33407111 | 10/1983 |
| EP | 0 209 997 A1 | 1/1987 |
| EP | 0 457 665 A1 | 11/1991 |
| EP | 0 591 297 A1 | 4/1994 |
| EP | 0 774 451 A1 | 5/1997 |
| EP | 1396531 A2 | 3/2003 |
| EP | 1681337 A1 | 7/2006 |
| FI | 66899 B | 8/1984 |
| FI | 100248 B | 2/1996 |
| FR | 579 601 A | 10/1924 |
| GB | 175974 A | 6/1923 |
| GB | 1193220 | 5/1970 |
| GB | 1 524 781 | 9/1978 |
| JP | 59108008 | 6/1984 |
| JP | 01056792 A | 3/1989 |
| WO | WO-93/00320 A1 | 1/1993 |
| WO | WO-96/17902 | 6/1996 |
| WO | WO-2004/062763 A2 | 7/2004 |

OTHER PUBLICATIONS

Notification of Transmittal of the International Search Report and Written Opinion of the International Searching Authority for PCT/FI2006/050553.
Kirk-Othmer, Encyclopedia of Chemical Technology, 3$^{rd}$ ed., (1980), vol. 7, Wiley, p. 768.
Maier, W.F., et al., Gas Phase Decarboxylation of Carboxylic Acids, Chem. Ber., (1982), vol. 115, pp. 808-812.
Laurent, E., et al., Study of the hydrodeoygenation of carbonyl, carboxylic and guaiacyl groups over sulfided CoMo/ γ-Al$_2$O$_3$ and NiMo/ γ-Al$_2$O$_3$ catalyst. II. Influence of water, ammonia and hydrogen sulfide, Applied Catalysis A, (1994), vol. 109, pp. 97-115.
Laurent, E., et al., Study of the hydrodeoygenation of carbonyl, carboxylic and guaiacyl groups over sulfided CoMo/ γ-Al$_2$O$_3$ and NiMo/ γ-Al$_2$O$_3$ catalysts. I. Catalytic reaction schemes, Applied Catalysis A, (1994), vol. 109, pp. 77-96.
Koster, R.M., et al., Active sites in the clay catalysed dimerisation of oleic acid, Journal of Molecular Catalysis A: Chemical, (1998), vol. 134, pp. 159-169.
Fette, Seifen, Anstrichmittel, U.-A. Schaper, vol. 82, No. 11, 1980, pp. 454-456, "Die gemischte Guerbet-Reaktion zwischen cyclischen und acyclischen Alkoholen".
Ullmanns Encyklopadie der technischen Chemie, 4., neubearbeitete und erweiterte Auflage, Band 13, Verlag Chemie GmbH, Weinheim 1983, Hydrierung p. 140.
Klimkiewicz et al., J. Chem. Technol. Biotechnol., vol. 76, 2001, pp. 35-38.
Burg, et al., JAOCS, (1991), vol. 68, (8), pp. 600-603.
Cui, S.T., et al., "Nonequlibrium Molecular Dynamics Simulation of the Rheology of Linear and Branched Alkanes", International Journal of Thermophysics, 1988, vol. 19, No. 2, pp. 449-459.
English translation of Finnish Patent Office Search Report for Finnish Patent Application No. FI-200566665.
PCT Notification of Transmittal of the International Search Report and the Written Opinion of the International Searching Authority or the Declaration of Application No. FI-2006050550.
"Scope of Accreditation for Testing" Thai Laboratory Accreditation Scheme, Thai Industrial Standards Industry, Ministry of Industry, Issue No. 9, Sep. 25, 2009.
Ulmanns, Encykolpadie der technischen Chemie, 4., neubearbeitete und erweiterte Auflage, Band 13, (1976), Verlag Chemie GmbH, Weinheim, p. 146.
Office Action issued in U.S. Appl. No. 11/636,567 on Jan. 27, 2009.
Office Action issued in U.S. Appl. No. 11/637,107 on Apr. 6, 2009.
Office Action issued in U.S. Appl. No. 11/637,107 on Dec. 14, 2009.
Search report from PCT/FI2006/050548.
Kirk-Othmer, Encyclopedia of Chemical Technology, 3rd ed., (1980), vol. 9, Wiley, p. 370.
Office Action issued in U.S. Appl. No. 11/637,139 on Dec. 31, 2009.
Office Action issued in U.S. Appl. No. 11/637,107 on Apr. 21, 2010.
Office Action issued in U.S. Appl. No. 11/637,139 on Jan. 23, 2009.
Advisory Action dated Dec. 15, 2009 issued in U.S. Appl. No. 11/636,567.
Office Action dated Aug. 6, 2010 issued in U.S. Appl. No. 11/636,567.
Office Action dated Aug. 6, 2010 issued in U.S. Appl. No. 11/637,107.
Office Action dated Apr. 26, 2010 issued in U.S. Appl. No. 11/637,139.
Office Action dated Aug. 25, 2010 issued in U.S. Appl. No. 12/433,394.
Morrison, R.T. and Boyd, R. N., Organic Chemistry, 5th ed. (1987), Allyn and Bacon, Newton, Massachusetts, pp. 94, 640, 679-680, 913-914.
Office Action dated Aug. 18, 2009 issued in U.S. Appl. No. 11/636,567.
Office Action dated Apr. 6, 2009 issued in U.S. Appl. No. 11/637,139.

PROCESS FOR PRODUCING A SATURATED HYDROCARBON COMPONENT

This application claims priority to U.S. Provisional Application 60/749,033, filed Dec. 12, 2005, under 35 U.S.C. §119 (e).

TECHNICAL FIELD

The invention relates to a process based on oligomerization and deoxygenation for producing a hydrocarbon component, and particularly for producing high-quality saturated base oil. In the process feedstock of biological origin is preferably utilized, eventually derived from plant and fish oils, animal fats, natural waxes, carbohydrates and corresponding synthetic materials and combinations thereof.

PRIOR ART

Base oils are commonly used for the production of lubricants, such as lubricating oils for automotives, industrial lubricants and lubricating greases. They are also used as process oils, white oils and metal working oils. Finished lubricants consist of two general components, lubricating base oil and additives. Lubricating base oil is the major constituent in these finished lubricants and contributes significantly to the properties of the finished lubricant. In general, a few lubricating base oils are used to manufacture a wide variety of finished lubricants by varying the mixtures of individual lubricating base oils and individual additives.

Base oils according to the classification of the American Petroleum Institute (API) Group III or IV are used in high-quality lubricants. API base oil classification is shown in Table 1.

TABLE 1

API base oil classification

| Group | Saturated hydrocarbons wt-% (ASTM D 2007) | Sulfur, wt-% (ASTM D 1552/ D 2622 D 3120/ D 4294/D 4927) | Viscosity index (VI) (ASTM D 2270) |
|---|---|---|---|
| I | <90 and/or | >0.03 | $80 \leq VI < 120$ |
| II | $\geq 90$ | $\leq 0.03$ | $80 \leq VI < 120$ |
| III | $\geq 90$ | $\leq 0.03$ | $\geq 120$ |
| IV | All polyalphaolefins (PAO) | | |
| V | All other base oils not belonging to Groups I-IV | | |

Oils of the Group III are base oils with very high viscosity indices (VHVI) produced by modern methods from crude oil by hydrocracking, followed by isomerization of the waxy linear paraffins to give branched paraffins. Oils of Group III also include base oils produced from Slack Wax paraffins from mineral oils, and from waxes obtained by Fischer-Tropsch synthesis (GTL waxes), for instance from coal or natural gas using corresponding isomerization techniques. Oils of Group IV are synthetic polyalphaolefins (PAO). A similar classification is also used by ATIEL (Association Technique de l'Industrie Européenne des Lubrifiants, or Technical Association of the European Lubricants Industry), said classification also comprising Group VI: Polyinternalolefins (PIO). In addition to the official classification, also Group II+ is commonly used in this field, this group comprising saturated and non-sulfurous base oils having viscosity indices of more than 110, but below 120. In these classifications saturated hydrocarbons include paraffinic and naphthenic compounds, but not aromatics.

There is also available a definition for base stocks according to API 1509 as: "A base stock is a lubricant component that is produced by a single manufacturer to the same specifications (independent of feed source or manufacturer's location); that meets the same manufacturer's specification; and that is identified by a unique formula, product identification number, or both. Base stocks may be manufactured using a variety of different processes." Base oil is the base stock or blend of base stocks used in API-licensed oil. The known base stock types are 1) Mineral oil (paraffinic, naphthenic, aromatic), 2) Synthetic (polyalphaolefins, alkylated aromatics, diesters, polyol esters, polyalkylene glycols, phosphate esters, silicones), and 3) Plant oil.

Already for a long time, especially the automotive industry has required lubricants and thus base oils with improved technical properties. Increasingly, the specifications for finished lubricants require products with excellent low temperature properties, high oxidation stability and low volatility. Generally lubricating base oils are base oils having kinematic viscosity of about 3 cSt or greater at 100° C. (KV100); pour point (PP) of about −12° C. or less; and viscosity index (VI) about 120 or greater. In addition to low pour points also the low-temperature fluidity of multi-grade engine oils is needed to guarantee that in cold weather the engine starts easily. The low-temperature fluidity is demonstrated as apparent viscosity in cold cranking simulator tests at −5 to −40° C. temperature. Lubricating base oils having KV100 of about 4 cSt should typically have CCS viscosity at −30° C. (CCS-30) lower than 1800 and oils having KV100 of about 5 cSt should have CCS-30 lower than 2700. The lower the value is the better. In general, lubricating base oils should have a Noack volatility no greater than current conventional Group I or Group II light neutral oils. Currently, only a small fraction of the base oils manufactured today are able to meet these demanding specifications.

It is no longer possible to produce lubricants complying with the specifications of the most demanding car manufacturers from conventional mineral oils. Typically, mineral oils often contain too high concentrations of aromatic, sulfur, and nitrogen compounds, and further, they also have a high volatility and a modest viscosity index, that is, viscosity-temperature dependence. Moreover, response of mineral oils to antioxidant additives is often low. Synthetic and so-called semi-synthetic base oils play an increasingly important role especially in automotive lubricants, such as in engine and gear oils. A similar development can be seen for industrial lubricants. Service life of lubricants is desirably as long as possible, thus avoiding frequent oil changes by the user, and further allowing extended maintenance intervals of vehicles for instance in commercial transportation. In the past decade, engine oil change intervals for passenger cars have increased five fold, being at best 50,000 km. For heavy-duty vehicles, engine oil change intervals are at present already on the level of 100,000 km.

The production of lubricants is influenced by increasingly common "Life Cycle Approach" (LCA) concerning environment, health and safety factors of the product. What is aimed with LCA are an extended service life of the product, and minimal drawbacks to the environments associated with the production, use, handling and disposal of the product. Longer oil change intervals of high-quality base oils result in decreased consumption of non-renewable mineral crude oil based raw materials, and lower amounts of hazardous waste oil products.

In addition to the demands for engine technology and base oil production, also strict environmental requirements direct the industry to develop more sophisticated base oils. Sulfur free fuels and base oils are required in order to gain full effect of new and efficient anti-pollution technologies in modern vehicles and to cut emissions of nitrogen oxides, volatile hydrocarbons and particles, as well as to achieve direct reduction of sulfur dioxide in exhaust gases. The European Union has decided that these fuels shall be available to the market from 2005 and they must be the only form on sale from 2009. Conventional mineral oil base oils contain sulfur, nitrogen, aromatic compounds, and typically also volatile compounds. They are less suitable for new engines and thus also environmentally more detrimental than newer sulfur and aromatic free base oils.

Nowadays, the use of recycled oils and renewable raw materials in the production of lubricants is frequently an object of interest. The use of renewable raw materials of biological origin instead of non-renewable fossil raw materials to produce hydrocarbon components is desirable, because the fossil raw materials are exhaustible and their effect on environment is detrimental. Problems associated with recycled oils include complicated purification and reprocessing steps to obtain base oils with high quality. Further, the development of a functioning and extensive recycling logistic system is expensive.

For the time being, only esters are used in lubricants of renewable and biological origin. The use of esters is limited to a few special applications such as oils for refrigeration compressor lubricants, bio-hydraulic oils and metal working oils. In normal automotive and industrial lubricants, they are used mainly in additive scale. High price also limit the use of esters. In addition, the esters used in engine oil formulations are not interchangeable with other esters without performing new engine tests, even in cases where the chemical composition of the substituting ester is in principle totally similar. Instead, base oils consisting of pure hydrocarbon structure are partly interchangeable with each other. There are also some technical problems associated with esters. As polar compounds, esters suffer greater seal-swelling tendency than pure hydrocarbons. This has created lot of problems relating to elastomers in hydraulic applications. In addition, ester base oils are hydrolyzed more easily producing acids, which in turn cause corrosion on lubricating systems. Further, even greater disadvantage of esters is that additives developed for non-polar hydrocarbon base oils are not effective for ester base oils.

Processes wherein triglycerides are cross-linked in a controlled manner using a suitable metal salt or peroxide initiator, which readily capture hydrogen from the C—H bond, together with suitable amounts of oxygen are known in the art. Some cross-linking is also caused by atmospheric oxygen without heating the product, the reaction being, however, slower. This cross-linking is based on oxygen-oxygen bonds formed in the molecules. During cross-linking of the triglycerides, the degree of cross-linking may be controlled by means of processing time and kinematic viscosity. The viscosity increases with cross-linking as a function of time, and decreases as the product decomposes.

Also a thermal batch process based on reactions of double bonds for producing stand oil from triglycerides is known, with carbon dioxide being introduced to the reactor for preventing oxidation. In this case, cross-linking is based on the carbon-carbon bonds being formed in the molecules. The decomposition products of the thermal reaction are removed by entrainment with the carbon dioxide gas stream, or alternatively using vacuum. Cross-linking is an exothermal reaction and accordingly, both efficient heating for providing the reaction and efficient cooling to prevent overheating of the product is necessary to maintain the temperature between 280 and 300° C. Moreover, the reaction vessel must be quickly cooled after reaching the desired viscosity, indicating the degree of cross-linking.

In Kirk-Othmer: *Encyclopedia of Chemical Technology*, $3^{rd}$ Ed., vol. 7, *Dimer acids*, p. 768 a method is presented for producing dimeric acids from unsaturated carboxylic acids with a radical reaction using a cationic catalyst, the reaction temperature being 230° C. In addition to acyclic branched, unsaturated dimeric acid as the main product also mono and bicyclic dimers are formed.

Unsaturated alcohols may be oligomerized in a similar manner as unsaturated carboxylic acids using heat and/or catalyst to give alcohol dimers. An acyclic unsaturated branched diol dimer is the main product.

In Koster R. M. et al., *Journal of Molecular Catalysis A*: Chemical 134 (1998) 159-169, oligomerization of carboxylic acids, carboxylic acid methyl esters, and synthetic alcohols and olefins is described, yielding corresponding dimers.

The cross-linked triglyceride, carboxylic acid methyl ester dimer, carboxylic acid dimer, and fatty alcohol dimer products may be used in lubricant applications, but since the products contain heteroatoms, they are endowed with corresponding weaknesses as the base oils derived from esters.

Processes wherein the oxygen of a carboxylic acid or ester is removed are also known. Decarboxylation of fatty acids results in hydrocarbons with one carbon atom less than the original molecule. The feasibility of decarboxylation varies greatly with the type of carboxylic acid used as the starting material. Activated carboxylic acids containing electron-attracting substituents in the position alpha or beta with respect to the carboxylic group lose carbon dioxide spontaneously at slightly elevated temperatures. In this case, the RC—COOH bond is weakened by the electron shift along the carbon chain.

With other types of carboxylic acids, the hydrocarbon chain brings about an opposite increase of the electron density at alpha carbon, and thus, cleavage of carbon dioxide is difficult. A suitable catalyst contributes to the reaction. In Maier, W. F. et al., *Chemische Berichte* (1982), 115(2), 808-812, hydrocarbons are produced from carboxylic acids using heterogeneous $Ni/Al_2O_3$ and $Pd/SiO_2$ catalysts at 180° C. under hydrogen atmosphere.

Combined decarboxylation and hydrodeoxygenation of oxygen containing compounds is disclosed in Laurent, E., Delmon, B.: *Applied Catalysis, A*: General (1994), 109(1), 77-96, and 97-115, wherein pyrolysis oils derived from biomass were subjected to hydrodeoxygenation using sulfurized $CoMo/\gamma$-$Al_2O_3$ and $NiMo/\gamma$-$Al_2O_3$ catalysts at 260-300° C., under a hydrogen pressure of 7 MPa. Reactions of hydrodeoxygenation step are highly exothermal, and require high amounts of hydrogen.

FI 100248 presents a process with two steps wherein middle distillate is produced from plant oil by hydrogenation of the carboxylic acids or triglycerides of the plant oil to yield linear normal paraffins, followed by isomerization of said n-paraffins to give branched paraffins. Conditions of this hydrogen treatment include a temperature between 330 and 450° C., a pressure of 3 MPa, and a liquid hourly space velocity (LHSV) of 0.5-5 l/h. In the isomerization step a temperature between 200 and 500° C. under pressure higher than atmospheric and LHSV of 0.1-10 l/h were used.

In isomerization processes, noble metal catalysts that are very expensive and highly sensitive to catalyst poisons are used. Starting materials from biological sources contain high amounts of oxygen yielding water, carbon monoxide, and carbon dioxide as the starting material is processed. In addition, said starting materials of biological origin often contain nitrogen, sulfur and phosphorus compounds known as catalyst poisons and inhibitors of noble metal catalysts. They cause decreased service life of the catalyst, and make frequent regeneration of the catalysts necessary unless removed prior to isomerization process.

Typical basic structural unit of plant and fish oils and animal fats is a triglyceride. Triglyceride is an ester of glycerol with three fatty acid molecules having the structure below:

wherein $R_1$, $R_2$ and $R_3$ represent C4-C30 hydrocarbon chains. Fatty acids are carboxylic acids having long unbranched hydrocarbon chains. Lengths of the hydrocarbon chains are mainly 18 carbons (C18). C18 fatty acids are typically bonded to the middle hydroxyl group of glycerol. Typical carbon numbers of the fatty acids linked to the two other hydroxyl groups are even, being between carbon numbers C14 and C22.

Fatty acid composition of the starting material of biological origin may considerably vary among feedstocks from different sources. While several double bonds may be present in fatty acids, they are non-conjugated, but at least one intermediate —$CH_2$— unit is between them. With respect to configuration, the double bonds of natural fatty acids are of cis form, hydrogen atoms being thus located on the same side of the rather rigid double bond. As the number of the double bonds increase, they are generally located at the free end of the chain. Lengths of hydrocarbon chains and numbers of double bonds depend on the various plant or animal fats or waxes serving as the source of the fatty acid. Animal fats typically contain more saturated fatty acids than unsaturated fatty acids. Fatty acids of fish oil contain high amounts of double bonds, and the average length of the hydrocarbon chains is higher compared to fatty acids of plant oils and animal fats. Fatty acid composition play an important role in the evaluation of the oxidation resistance, thermal resistance, and low temperature properties of the feedstock subjected to oligomerization, and further, the type of oligomerization products.

Waxes are mainly carboxylic acids esterified with alcohols having long chains. Moreover, waxes contain varying amounts of paraffins (n-alkanes), ketones, and diketones, primary and secondary alcohols, aldehydes, alkane acids (carboxylic acids), and terpenes. Carbon numbers of said carboxylic acid and alcohol chains are typically between C12 and C38.

Prior to processing, starting materials of biological origin are commonly pretreated with any suitable known methods such as thermally, mechanically for instance by means of shear forces, chemically for instance with acids or bases, or physically with radiation, distillation, cooling, or filtering. The purpose of said chemical and physical pretreatments is to remove impurities interfering with the process or poisoning the catalysts, and reduce unwanted side reactions.

In a hydrolysis treatment, oils and fats react with water yielding free fatty acids and glycerol as the product. Three main processes for the industrial production of fatty acids are known: vapour splitting of triglycerides under high pressure, basic hydrolysis, and enzymatic hydrolysis. In the vapour splitting process, the hydrolysis of triglycerides using steam is carried out at temperatures between 100 and 300° C., under a pressure of 1-10 MPa, preferable conditions being from 250 to 260° C. and from 4 to 5.5 MPa. Metal oxides like zinc oxide may be added as the catalyst to accelerate the reaction. High temperature and pressure contribute to the dissolution of fats in water.

Paraffinic synthetic base oils produced by oligomerization are known in the art, the typical ones being PAO (polyalphaolefins) and PIO (polyinternal olefins). In the production thereof, olefinic starting materials from crude oil are used, said starting materials containing no heteroatoms. The development of base oils of the polyalphaolefin type was started in the 1930's both in the USA and in Germany where mainly products with superior low temperature properties suitable for aircrafts were developed. 1-alkene monomers to be used as starting materials for PAO are typically produced from ethylene. For commercial PAOs, C8-C12 alpha olefins or C14-C18 alpha olefins are primarily used as starting materials. In the production of PAO, the monomer is polymerized thermally or using catalysts of the Ziegler or Friedel-Crafts type, or using zeolite catalysts to give heavier products, followed by distillation to obtain desired product fractions, and hydrogenated to give saturated paraffins. It is possible to produce PAO products belonging to various viscosity classes, the typical representatives having kinematic viscosities of 2, 4, 6 and 8 $mm^2/s$ at 100° C. (KV100). Moreover, particularly thick base oils PAO40 and PAO100 having KV100 values of 40 and 100 $mm^2/s$ are produced, said base oils being generally used for the production of thick lubricants, and as viscosity index improvers (VII). PAO products have high viscosity indices, and at the same time, excellent low temperature properties, pour points being as low as −60° C. Because lighter monomeric compounds are removed by distillation, the volatilities of the products are low and flash points are high. Oxidation resistance is quite modest without antioxidant additives.

PIOs are produced by oligomerizing internal olefins, the double bonds of which are statistically distributed along the whole length of the hydrocarbon chain. Internal olefins may be produced by dehydrogenating n-paraffines derived from crude oil. Molecular structures of the products produced from internal C15-C16 linear olefins differ from that of PAO. In comparison to PAO, the properties of PIO are poorer; the viscosity index is lower, pour point is poorer, and volatility is higher. Considering quality, PIOs lie between PAO and VHVI. The production technology for PIO is similar to that for PAO, with the exception of a more aggressive catalytic system for the oligomerization of the less reactive internal olefins. Solubility of additives in PAO and PIO is rather poor due to lacking polarity. Esters are often used in formulations to improve solubility.

The use of starting materials of biological origin containing heteroatoms has so far not been reported or intermediates optionally thermally and/or chemically and/or physically and/or mechanically treated, in the production of high-quality saturated base oils.

On the basis of the above teaching, it may be seen that there is an obvious need for a new alternative process for producing hydrocarbon components preferably from starting materials of biological origin, and to avoid problems associated with prior art solutions or at least substantially reduce them. There is also a need for nonpolar saturated base oils complying with the quality requirements for high-quality base oils, said base oil being preferably of biological origin and having more preferable effects on the environment and for end users than traditional mineral base oils. In addition, there is a need for a process based on the use of renewable feedstocks, thus saving non-renewable raw materials.

OBJECTS OF THE INVENTION

An object of the invention is a process for producing a saturated hydrocarbon component.

A further object of the invention is a process for producing a saturated hydrocarbon component wherein starting materials of biological origin are used.

Another object of the invention is a process for producing a new type of base oils.

Still another object of the invention is a process for producing saturated base oils not containing heteroatoms from starting materials of biological origin.

Further, another object of the invention is a process for producing saturated diesel component and gasoline components not containing heteroatoms from starting materials of biological origin.

An object of the invention is moreover a base oil complying with the requirements of the API Group III.

The characteristic features of the process, and base oils of the invention are presented in the appended claims.

GENERAL DESCRIPTION OF THE INVENTION

The process of the invention comprises an oligomerization step wherein the molecules of the feedstock reacts with each other, thus increasing the carbon number of the component obtained, and further, a deoxygenation step. Said deoxygenation may be carried out either as hydrodeoxygenation reaction or decarboxylation/decarbonylation reactions. In addition, the process of the invention may also comprise an optional isomerization step for isomerization of the lighter products, and/or a finishing step. The feedstock for the process is preferably from biological origin.

In this context, oligomerization refers to dimerization, trimerization and tetramerization reactions, as well as polymerization and cross-linking reactions.

The oligomerization step of the process of the invention is performed to extend hydrocarbon chain of unsaturated carboxylic acids and/or derivatives thereof, such as esters, anhydrides and alcohols from a monomeric unit to give a dimer with two monomeric units, and to higher oligomers. In this oligomerization reaction, double bonds of the components react with each other under the influence of heat and/or a catalyst.

Carboxylic acids and derivatives thereof also include here fatty acids and derivatives thereof. Carbon number of carboxylic acids and derivatives thereof is at least C4. Fatty acids of biological origin and/or derivatives thereof are preferably used.

Deoxygenation refers here to removal of oxygen either by hydrodeoxygenation or by decarboxylation/decarbonylation reaction. In the deoxygenation, the structure of the biological starting material will be converted to be either paraffinic or olefinic, according to the catalyst and reaction conditions used.

In this context, hydrodeoxygenation (HDO) refers to removal of oxygen by means of hydrogen. Water is liberated in the reaction when esters, alcohols, anhydrides or carboxylic acid groups are decomposed. All oxygen, nitrogen, phosphorus and sulfur atoms are removed.

Decarboxylation refers here to the removal of oxygen as carbon dioxide, and decarbonylation refers to the removal of oxygen as carbon monoxide.

In this context, isomerization refers to hydroisomerization of linear hydrocarbons (paraffins) resulting in a branched structure.

The term "saturated hydrocarbon", used in the specification refers to paraffinic and naphthenic compounds, but not to aromatics. Paraffinic compounds may either be branched or linear. Naphthenic compounds are cyclic saturated hydrocarbons, i.e cycloparaffins. Such a hydrocarbon with a cyclic structure is typically derived from cyclopentane or cyclohexane. A naphthenic compound may comprise a single ring structure (mononaphthene) or two isolated ring structures (isolated dinaphthene), or two fused ring structures (fused dinaphthene) or three or more fused ring structures (polycyclic naphthenes or polynaphthenes).

Saturated base oils comprise here saturated hydrocarbons.

Carboxylic acids marked for example C18:1 means C18 chain with one double bond.

In this context, pressures are gauge pressures relative to normal atmospheric pressure.

Classification of the periodic table of the elements is the IUPAC classification.

In this context, width of carbon number range refers to the difference of the carbon numbers of the largest and the smallest molecules, plus one, in the final product.

Figure 1:
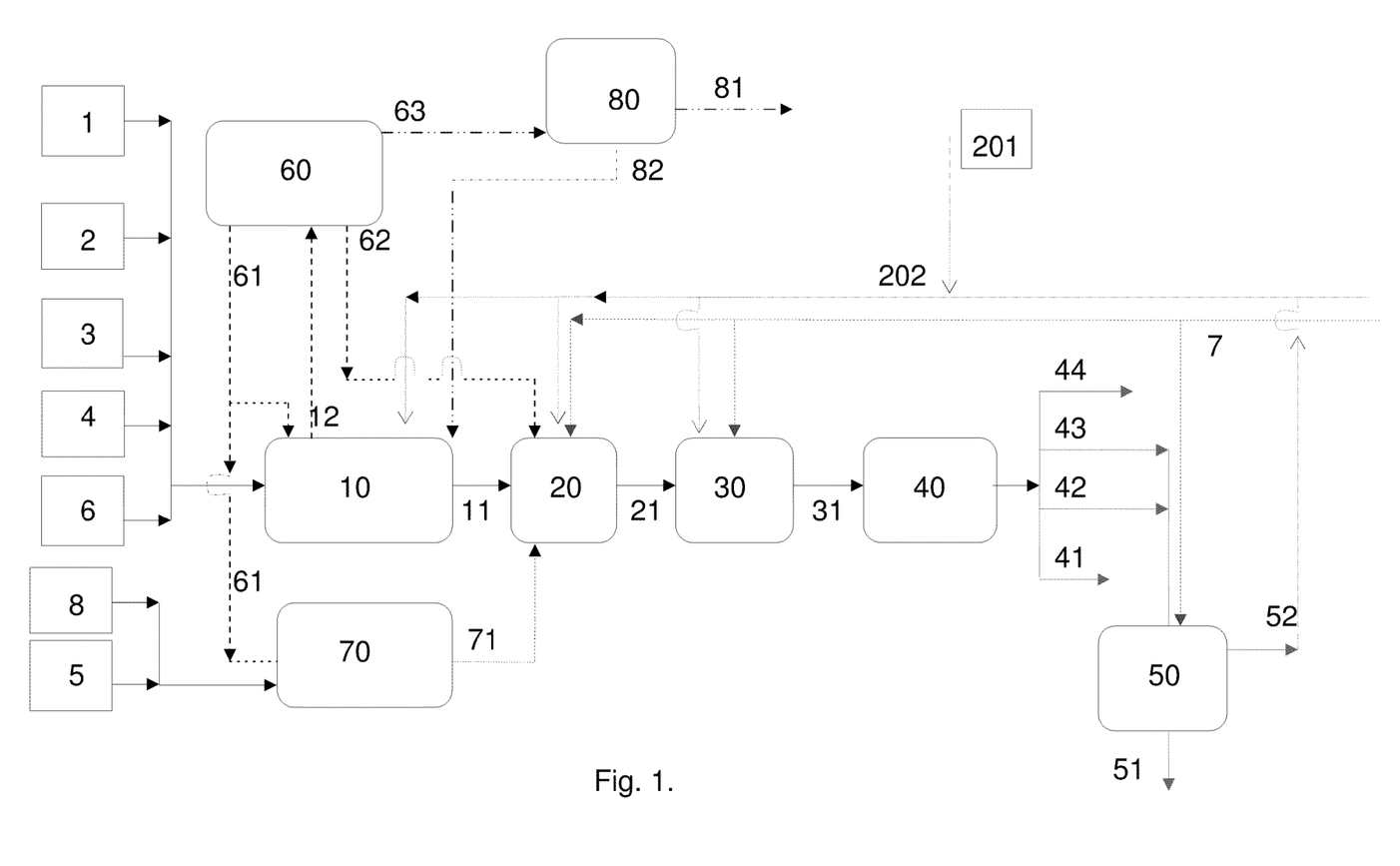

The invention is now illustrated with the appended FIG. 1 without wishing to limit the scope of the invention to the embodiment of said figure.

FIGURE

FIG. 1 shows a preferable embodiment of the process according to the invention. One or more feedstock(s) selected from the group consisting of: triglyceride feed stream 1, fatty acid feed stream 2, feed stream 3 of the esters of fatty acids with alcohols having short chains, fatty acid anhydride stream 4, and fatty alcohol stream 6, are introduced to the oligomerization reactor 10 either as separate components or as mixtures. Part of the lighter product fraction to be recycled (e.g. 52), or the hydrocarbon stream 201 may be optionally introduced to the oligomerization reactor 10 as a diluent. Diluent stream 202 comprises the recycled stream 52, or the hydrocarbon stream 201, or a mixture thereof. Product 11 containing components of the feedstock reacted at double bonds, and hydrogen as stream 7 are passed from the oligomerization reactor 10 to an optional prehydrogenation reactor 20 optionally also receiving a diluent stream 202. The product hydrogenated at double bonds from the prehydrogenation reactor 20 is passed as stream 21, and hydrogen is optionally passed as stream 7 to a deoxygenation reactor 30 optionally also receiving a diluent 202. In case deoxygenation is performed as decarboxylation/decarbonylation reaction, a mixture of hydrogen 7 and an inert gas e.g. nitrogen may be used as the gas stream (not shown in the figure). The product containing saturated hydrocarbons from the deoxygenation reactor 30 is passed as stream 31 to a distillation and/or separation unit 40 for separation of various product fractions, gas 44, gasoline 43, diesel 42, and base oil 41. Lighter gasoline and diesel fractions, respectively 43 and 42, are optionally isomerized in hydroisomerization unit 50 in the presence of hydrogen 7, thus yielding gasoline and diesel streams, respectively 51 and 52, containing branched hydrocarbons.

In case particularly fatty acids 2 and/or fatty acid esters 3 and/or fatty alcohols 6 are oligomerized, the product stream 12 may be withdrawn from the oligomerization reactor 10 followed by separation of the non-oligomerized components for instance by distillation 60. Light non-oligomerized components are recycled back to the oligomerization reactor 10 as the stream 61, and the oligomerized components may be passed to prehydrogenation 20 as the stream 62. In recycling, the stream 63 from distillation 69 may be passed to low temperature filtering 80 wherein saturated components 81 are separated from components 82 having double bonds to be passed to oligomerization 10. Alternatively, the distillate 61 may be passed to post-oligomerization reactor 70, in which unsaturated carboxylic acids 8 with smaller molecules, or olefins 5 may be introduced for branching linear non-oligomerized unsaturated components. The product containing components of the feedstock reacted at double bonds is passed from the post-oligomerization reactor 70 as the stream 71 to an optional prehydrogenation reactor 20.

DETAILED DESCRIPTION OF THE INVENTION

It was now surprisingly found that with the process of the invention comprising oligomerization and deoxygenation steps and an optional isomerization step, high-quality hydrocarbon components and particularly saturated base oils may be produced from unsaturated carboxylic acids containing heteroatoms, and from derivatives thereof, particularly from fatty acids, fatty acid esters, fatty alcohols, respective fatty acid anhydrides of biological origin, and/or mixtures thereof. The problems of the prior art processes and products obtained therewith may be avoided, or at least substantially reduced by means of the process of the invention.

In the process of the invention, especially oligomerization reactions of materials of biological origin may be utilized in combination with deoxygenation reaction for the production of saturated base oils in a novel manner. For the oligomerization of unsaturated carboxylic acids and/or derivatives thereof, such as fatty acids, fatty acid esters, fatty alcohols, fatty acid anhydrides, and/or mixtures thereof, the monomers are converted into dimers with two monomers and into higher oligomers. In case starting materials of biological origin are used for the production of base oils, it is necessary to extend the hydrocarbon chain length to reach the carbon number range required in the base oil applications, leaving only carbon-carbon bonds in the main structure of the molecule. According to the invention, this is carried out by allowing the compounds having double bonds to react with each other, thus producing desired carbon-carbon bonds, and further, yielding hydrocarbons with carbon numbers in the range from C18 to C550. In base oil applications, the carbon number range is typically from C18 to C76, and particularly the carbon number range of thick base oils may even be from C150 to C550. In the oligomerization reaction, for instance double bonds of the triglyceride molecules react with each other, thus forming a polymeric triglyceride network. With other feedstocks, mainly dimers, trimers, and tetramers are formed. In case the feedstock contains polyunsaturated hydrocarbon chains, after oligomerization and deoxygenation, greater amounts of trimers and hydrocarbons with ring structure are obtained than with monounsaturated hydrocarbon chains.

In the process of the invention, the feedstock of biological and/or synthetic origin is oligomerized and deoxygenated. The oligomerization of unsaturated feedstock components is preferably performed first, followed by deoxygenation to obtain saturated paraffins without heteroatoms. Alternatively, the unsaturated feedstock is first subjected to deoxygenation to remove heteroatoms, followed by oligomerization of the obtained olefinic product, the deoxygenation being, however, then carried out by decarboxylation or decarbonylation reaction, since the hydrodeoxygenation reaction is in this case unsuitable.

Following deoxygenation, the process may also comprise an optional isomerization of the lighter components. Linear normal paraffins having shorter chains, not belonging to the base oil carbon class, and produced as by-products of the process, may be isomerized to introduce branches to the hydrocarbon chain improving the cold flow properties of the product. These isomerized products may be used for instance as gasoline or diesel components, and further, components having carbon numbers from C18 to C24 may also be used as light base oil components.

The process may further comprise an optional prehydrogenation step prior to deoxygenation, an optional post oligomerization step following the actual oligomerization step, optional purification steps of the intermediates, recycling steps of the products, and a finishing step. Feedstocks may optionally be subjected to one or more pretreatment step(s), for example purification.

Feedstock

In the process of the invention, the feed comprises one or more component(s) selected from the group consisting of triglycerides, carboxylic acids having carbon numbers from C4 to C38, esters of C4 to C38 carboxylic acids and C1-C11 alcohols, C4-C38 carboxylic acid anhydrides, and C4-C38 alcohols. The feedstock is preferably selected from the group consisting of triglycerides, fatty acids having carbon numbers from C4 to C24, esters of C12 to C24 fatty acids and C1-C3 alcohols, C12-C24 fatty acid anhydrides, and C12-C24 fatty alcohols, and mixtures thereof. The feedstock preferably originates from starting materials of biological origin, or mixtures thereof.

Suitable starting materials of biological origin are selected from the group consisting of:
a) plant fats, plant oils, plant waxes; animal fats, animal oils, animal waxes; fish fats, fish oils, fish waxes, and mixtures thereof, and
b) free fatty acids or fatty acids obtained by hydrolysis, acid transesterification or pyrolysis reactions from plant fats, plant oils, plant waxes, animal fats, animal oils, animal waxes, fish fats, fish oils, fish waxes, and mixtures thereof, and
c) esters obtained by transesterification from plant fats, plant oils, plant waxes, animal fats, animal oils, animal waxes, fish fats, fish oils, fish waxes, and mixtures thereof, and
d) esters obtained by esterification of free fatty acids of plant, animal and fish origin with alcohols, and mixtures thereof, and
e) fatty alcohols obtained as reduction products of fatty acids from plant fats, plant oils, plant waxes, animal fats, animal oils, animal waxes, fish fats, fish oils, fish waxes, and mixtures thereof, and
f) waste and recycled food grade fats and oils, and fats, oils and waxes obtained by genetic engineering, and mixtures thereof, and
g) mixtures of said starting materials.

In this context, plants and animals also include algae and insects, respectively. The starting material of biological origin may also contain free carboxylic acids and/or esters of carboxylic acids, or oligomerization products of biological starting materials, without substantially interfering with the process. Suitable feedstocks are also all compound types mentioned that are produced either totally or partly synthetically.

Since the purpose of the process is the oligomerization of components having double bonds, the feedstock preferably contains at least 50%, and more preferably at least 80%, by weight, of unsaturated and/or polyunsaturated compounds. The unsaturated compound is preferably a monounsaturated component, particularly preferably a C16:1 and/or C18:1 component present in the feedstock in concentrations of above 40%, and preferably above 70%, by weight.

Examples of suitable biological starting materials include fish oils such as baltic herring oil, salmon oil, herring oil, tuna oil, anchovy oil, sardine oil, and mackerel oil; plant oils such as rapeseed oil, colza oil, canola oil, tall oil, sunflower seed oil, soybean oil, corn oil, hemp oil, olive oil, cottonseed oil, mustard oil, palm oil, peanut oil, castor oil, jatropha seed oil, palm kernel oil, and coconut oil; and moreover, suitable are also animal fats such as lard, tallow, and also waste and recycled food grade fats and oils, as well as fats, waxes and oils produced by genetic engineering. In addition to fats and oils, suitable starting materials of biological origin include animal waxes such as bee wax, Chinese wax (insect wax), shellac wax, and lanoline (wool wax), as well as plant waxes such as carnauba palm wax, ouricouri palm wax, jojoba seed oil, candelilla wax, esparto wax, Japan wax, and rice bran oil.

The process may also be used for processing mixtures of feedstocks of biological origin, and synthetic feedstocks, using additional feedstocks produced with other processes, or synthetic feedstocks, if necessary, suitable for the process step in question. Also pure synthetic feedstocks are suitable, but in this case, the products are not based on renewable natural resources.

If desired, also linear olefins and olefins having ring structures, preferably C2-C14 olefins, may also be added in the feedstock, thus allowing for the increase of the molecular mass with lower carbon numbers than typical C12-C24 carboxylic acids. Components of the turpentine fraction of tall oil such as alpha pinene, and/or compounds having double bonds derived from sugars, and/or unsaturated compounds produced from carboxylic acids via metathesis, and/or synthetic compounds such as ethylene or propylene may be used as suitable additional olefinic components.

In the oligomerization, also unsaturated dicarboxylic acids having shorter chains (<C12), carboxylic acids, alcohols, and alkyl esters may be used as additional feedstocks, allowing for the increase of the molecular mass with lower carbon than typical C12-C24 carboxylic acids, or derivatives of carboxylic acids. Suitable unsaturated dicarboxylic acids include maleic acid, fumaric acid, citraconic acid, mesaconic acid, itaconic acid, 2-methylene glutaric acid, and muconic acid.

In the optional post-oligomerization reaction of the invention, for instance above molecules having short chains may be oligomerized to carboxylic acids or alkyl esters of a carboxylic acid or triglycerides or other molecules with double bonds. Double bonds of compounds derived from carboxylic acids are usually located in the middle of hydrocarbon chain. Smaller molecules are reacted with double bonds to give linear or ring structures located in the middle of hydrocarbon chain.

Since the cycle length of the catalyst is short in the processes of carboxylic acids, the feedstock may first be converted into esters or alcohols, which are less aggressive to the catalyst. Triglycerides may be transesterified with an alcohol to obtain alkyl esters. Triglycerides decompose to form an ester with the alcohol and glycerol. Typically methanol is used as the alcohol, but also other C1-C11 alcohols may be used. Typical conditions for the transesterification are as follows: temperature between 60 and 70° C., pressure between 0.1 and 2 MPa. Excess amounts of sodium and potassium hydroxides dissolved in methanol are used as catalysts. Esterification of free carboxylic acids and alcohol requires higher temperature and pressure (e.g. 240° C. and 9 MPa), or acidic conditions.

Carboxylic acids may also be reduced in known manner to fatty alcohols, either by direct reduction of the acidic groups to alcohols with lithium aluminium hydride, thus double bonds remains in alcohols, or by hydrogenation of the alkyl esters of carboxylic acids to give unsaturated fatty alcohols using a copper-zinc catalyst at a temperature between 200 and 230° C., and under a hydrogen pressure between 20 and 30 MPa. In the hydrogenation reaction, the alcohol used for the esterification of the carboxylic acid is liberated and may be recycled back to the esterification, whereas the unsaturated fatty alcohols are passed to the oligomerization.

In various process steps, hydrocarbons may be used as diluents in the feedstock. Hydrocarbon can be for instance from biological origin and boiling in diesel fuel range between 150 and 400° C., typically between 180 and 360° C.

The biological starting material yielding the feedstock is preferably pretreated by known methods for instance to remove impurities. Hydrolysis reaction of triglycerides may be utilized to produce carboxylic acids to be used as a feed to oligomerization step. Alternatively, the triglycerides may be hydrolyzed following oligomerization. In the hydrolysis, glycerol is obtained as the by-product, and thus no hydrogen is consumed in the HDO step for hydrogenation of glycerol to yield propane gas. For instance, either the feedstock or the product may be fractioned by distillation to narrower fractions with respect to boiling ranges or carbon numbers, and further, impurities of the feedstock or the final product may be removed by filtering through suitable filtering aids.

The Process

Oligomerization Step

According to a preferable embodiment of the process of the invention, feedstock comprising at least one component with double bonds is selected from the group of triglycerides, carboxylic acids, acid anhydrides, and/or fatty alcohols and oligomerized. The feedstock contains at least 50% by weight of unsaturated and/or polyunsaturated compounds. One of the components of the feedstock is preferably selected as the main starting material for the oligomerization step and the oligomerization conditions are adjusted according to this main starting material. Other feed materials may be mixed with said main starting materials as long as they will not interfere with the process, or are advantageous for processing.

Oligomerization reactions are catalyzed by heat and a suitable catalyst. Suitable catalysts include cationic clay catalysts, preferably zeolite catalysts, particularly preferable montmorillonite. Oligomerization reactions of carboxylic acids may be enhanced by additional reagents such as water. In the oligomerization of carboxylic acids, up to 10%, preferably from 0.1 to 4%, and particularly preferably from 1 to 2%, by weight, of water is added to the feedstock. It is not preferable to use excessive amounts of water, because estolides not dimerized with carbon-carbon bonds are then produced as by-products.

Suitable oligomerization reactors include fixed bed reactors and mixing tank reactors. Diluents for adjusting the oligomerization may be used in the reaction. The diesel fraction or another hydrocarbon obtained from the process is a suitable diluent that may be recycled. Pressure of the oligomerization step is between 0 and 10 MPa, the temperature being between 100 and 500° C., preferably from 0 to 5 MPa, and from 200 to 400° C., respectively. In case the reaction is performed as a batch reaction, the catalyst amount is from 0.01 to 30%, by weight of the total reaction mixture, preferably from 0.5 to 10% by weight. In case a fixed bed reactor is used, the amount of the feedstock, expressed as grams per hour per gram of the catalyst, ranges between 0.1 and 100 l/h.

In a mixed tank reactor, the reaction time is less than 16 hours, preferably less than 8, particularly preferable less than 4 hours. In case short residence time is used, the lighter non-oligomerized components may be separated from heavier components already oligomerized for instance by distillation, followed by recycling the lighter components to oligomerization. During recycling, the unreactive saturated components may be separated from components having double bonds for instance by low temperature filtering. Saturated components are passed to deoxygenation, and optional isomerization for branching the hydrocarbon chains.

Prehydrogenation Step

The activity of hydrogenation catalysts is primarily lost due to coke formed on the catalyst surface, and thus the product from the oligomerization step may be optionally subjected to prehydrogenation under mild conditions to hydrogenate the double bonds, and further, to reduce the formation of coke in the next deoxygenation step. Prehydrogenation is performed in the presence of prehydrogenation catalyst, at a temperature between 50 and 400° C., under a hydrogen pressure ranging from 0.1 to 20 MPa, the flow rate WHSV being between 0.1 and 10 l/h, preferably at a temperature between 150 and 250° C., under a hydrogen pressure ranging from 1 to 10 MPa, the flow rate being from 1 to 5 l/h. The prehydrogenation catalyst contains metals of the Group VIII and/or VIA of the periodic table of the elements. The prehydrogenation catalyst is preferably a supported Pd, Pt, Ni, NiMo or CoMo catalyst, the support being either alumina and/or silica.

Deoxygenation Step

The deoxygenation may alternatively be performed either as hydrodeoxygenation or decarboxylation/decarbonylation. Deoxygenation preformed as hydrodeoxygenation (HDO) is suitable for all feedstocks. In the HDO step, oxygen and oligomerized and optionally prehydrogenated stream is passed to the HDO catalyst bed comprising one or more catalyst bed(s). In the HDO step, the pressure is between 0 and 20 MPa, preferably between 1 and 15 MPa, particularly preferably from 3 to 10 MPa, the temperature being from 100 to 500° C., preferably from 200 to 400° C., particularly preferably from 250 to 350° C., the flow rate WHSV is from 1 to 5 l/h, particularly preferably from WHSV from 1 to 3 l/h. In the HDO step, special hydrodeoxygenation catalysts containing a metal of the Group VIII and/or VIA of the periodic table of the elements, and a support may be used. The HDO catalyst is preferably a supported Pd, Pt, Ni, NiMo or CoMo catalyst, the support being either alumina and/or silica.

In case the feedstock contains carboxylic acids and/or carboxylic acid esters, the deoxygenation may be performed using a decarboxylation/decarbonylation reaction. In the decarboxylation/decarbonylation reaction, the feedstock and an optional diluent are introduced to the catalyst bed. The reaction takes place in liquid phase, and it may be carried out in atmospheric pressure. However, it is preferable to use vapour pressure according to the reaction temperature of the reaction mixture. Depending on the feedstock, the pressure in the decarboxylation/decarbonylation step is between 0 and 20 MPa, preferably between 0.1 and 20 MPa, the temperature is from 200 to 400° C., preferably from 250 to 350° C., and the flow rate WHSV is from 0.1 to 10 l/h, preferably from WHSV from 1 to 5 l/h. In the decarboxylation/decarbonylation step special catalysts is used. Catalyst contains a metal of the Group VIII and/or VIA of the periodic table of the elements, such as a supported Pd, Pt, Ni, NiMo or CoMo catalyst, the support being either alumina and/or silica and/or activated carbon. The decarboxylation/decarbonylation catalyst is preferably Pd supported on carbon in a case of no hydrogen is used in the process, and sulfurized NiMo supported on alumina in a case of a mixture of hydrogen and an inert gas such as nitrogen is used in the process. Functional groups no longer exist in the product of the decarboxylation/decarbonylation step and the products contain only carbon and hydrogen. The carbon number has been reduced by one carbon per functional group removed.

In case the deoxygenation is performed as decarboxylation/decarbonylation, the oligomerization may be carried out prior to deoxygenation, and accordingly, the feedstock of the oligomerization step contains unsaturated carboxylic acids and/or esters of carboxylic acids. In case the oligomerization is performed after the decarboxylation/decarbonylation step, the feed of the oligomerization step contains unsaturated compounds from decarboxylation/decarbonylation having the carbon numbers reduced by one carbon per functional group removed, compared to the feedstock.

In the deoxygenation step, HDO and decarboxylation/decarbonylation reactions described above may be performed simultaneously to yield carbon dioxide or carbon monoxide from part of the functional groups and part of the functional groups are hydrodeoxygenated.

Following the deoxygenation step, light fractions may be passed with hydrogen to a separate isomerization step. The pressure of the isomerization step is from 0.1 to 20 MPa, preferably from 5 to 10 MPa. The temperature is between 100 and 500° C., preferably from 200 to 400° C. In the isomerization step, special isomerization catalysts containing a molecular sieve and a metal of the Group VIII of the periodic table of the elements, such as Pd, and Pt may be used. Alumina and/or silica may be used as the support.

Following oligomerization and deoxygenation steps, the product stream may optionally be finished to remove double bonds and aromatics. In case the finishing step is carried out using hydrogen in the presence of a catalyst, the step is called hydrofinishing. In the hydrofinishing step, the pressure is from 1 to 20 MPa, preferably from 5 to 15 MPa. The temperature is between 50 and 500° C., preferably from 100 to 400° C. In the hydrofinishing step, special catalysts containing a metal of the Group VIII as well as alumina and/or silica may be used. The hydrofinishing catalyst is preferably a supported Pd, Pt, or Ni catalyst, the support being either alumina and/or silica. The finishing may also be carried out without hydrogen by removing polar components using adsorption materials, for instance clay or molecular sieve.

Following oligomerization, deoxygenation and optional isomerization and finishing steps, the product is fractionated, for instance by distillation. Typical carbon number ranges of the product components are as follows: gas C1-C4, gasoline C5-C10, diesel C11-C26, base oil C18-C76.

If desired, the hydrocarbon component obtained as the product or another suitable hydrocarbon stream may be recycled to various process steps such as to oligomerization and deoxygenation steps for improving the conversion and/or selectivity, or to control the exothermal nature of the reactions.

In an embodiment of the invention, the product already oligomerized may be oligomerized further by introducing additional monomer (mixing tank reactor) into the process, or by repeated recycling of the product already oligomerized while adding the monomer (continuous reactor). In this way, especially thick base oils having carbon numbers as high as C150-C550 may be provided, said thick base oils being useful in the production of thick lubricants and as improvers of the viscosity index.

Product

It was surprisingly found that high-quality saturated non-polar hydrocarbon component preferably of biological origin, having excellent viscosity and low temperature properties, especially suitable as base oils was obtained with the process of the invention. The product is branched by carbon-carbon bonds.

A hydrocarbon component preferably of biological origin, suitable as solvent, gasoline or diesel fuel or diesel fuel component is also obtained. The diesel component or C18-C24 base oil component may be isomerized to improve the low temperature properties. The gasoline component may be isomerized to increase the octane number. There is no need for isomerization in case olefins with short chains or unsaturated carboxylic acids with short chains are used in post-oligomerization of the process for branching the remaining double bonds.

The carbon number and the carbon number range of the base oil depend both on the biological starting material of the feedstock and the production process. Conventional carbon number range of the base oil applications of the prior art is from C18 to C76, whereas the carbon number range of particularly thick base oils may be as high as from C150 to C550. In case the kinematic viscosity range KV100 between 4 and 7 mm$^2$/S is desired, branched and/or cyclic paraffins with a single carbon number are typically obtained from feedstocks containing carboxylic acids with identical chain lengths using the process of the invention, following oligomerization and HDO steps.

The carbon number range, of the base oil or base oil component produced by the oligomerization and combined HDO-decarboxylation/decarbonylation process of the invention is extremely narrow, the carbon number range of the product being from C30 to C32 for feedstocks containing typically C16 components, and from C34 to C36 for feedstocks containing C18 components, in case the viscosity range KV100 between 4 and 7 mm$^2$/s is desired. In case the feedstock is a mixture of C16 and C18 components, the width of the carbon number range of the product is typically seven carbons. Carbon number range of the base oil of the invention may also be at very high level, even as high as from C150 to C550 in case particularly heavy base oils suitable as viscosity increasers and viscosity index improvers are desired.

In Table 2 below, carbon numbers and typical structures of base oils of biological origin according to the invention (1 and 2), and synthetic base oils of the prior art having a KV100 from 4 to 6 mm$^2$/s (3-5) are presented. Most typical carbon numbers are bold-faced. With respect to the molecular structures, the base oil or base oil component of the invention differs from the products of the prior art, as shown by the table.

In Table 2, structures of naphthenes are typical examples of a compound group. In structural examples, the carbon number ranges of the oligomeric dimers no. 1 and 2 produced from C18 are between C34 and C36, and between C51 and C54, respectively, whereas the carbon number ranges of known synthetic hydrocarbon base oils of the same viscosity class, such as PAO, is between C32 and C48, and C30 and C48 for PIO.

TABLE 2

Carbon numbers and typical structures of base oils

| Base oil | Carbon number/%, FIMS | Structure |
| --- | --- | --- |
| 1 Oligomeric dimer derived from C18 feed | C34/C35/C36 acyclic component <50% naphthenic >50% | |
| 2 Oligomeric trimer derived from C18 feed | C51/C52/C53/C54 | |

TABLE 2-continued

Carbon numbers and typical structures of base oils

| Base oil | Carbon number/%, FIMS | Structure |
|---|---|---|
| 3 PAO C16 | C32 about 60% + C48 about 40% | |
| 4 PAO C10 | C30 about 80% + C40 about 20% | |
| 5 PIO | C30-C48 | |

Saturated hydrocarbons are classified according to the carbon and hydrogen atoms by field ionization mass spectrometry (using the FIMS)

| | | |
|---|---|---|
| 1 | $C(n) \cdot H(2n + 2)$ | paraffins |
| 2 | $C(n) \cdot H(2n)$ | mononaphthenes |
| 3 | $C(n) \cdot H(2n - 2)$ | dinaphthenes |
| 4 | $C(n) \cdot H(2n - 4)$ | trinaphthenes |
| 5 | $C(n) \cdot H(2n - 6)$ | tetranaphthenes |
| 6 | $C(n) \cdot H(2n - 8)$ | pentanaphthenes |

In Table 2, the percentages (%, by FIMS) refer to the groups of compounds determined according to said method.

Base oil components of Table 2 are produced as follows:
1. Oligomerized and hydrogenated C18 fatty acid dimer according to the invention, produced from tall oil
2. Oligomerized and hydrogenated C18 fatty acid trimer according to the invention, produced from tall oil
3. PAO C16 produced by oligomerization from 1-hexadecene using a heterogeneous catalyst
4. PAO C10 produced by oligomerization from 1-decene using a homogeneous catalyst
5. PIO produced by dimerization of internal C15-C16 olefin.

Oligomerized dimers and trimers of the invention (structures 1 and 2 of Table 2) are branched at double bonds within C18 hydrocarbon chain, thus having pairs of tertiary carbons on adjacent carbon atoms in the molecular structure. PIO is typically a dimer produced from shorter C15-C16 hydrocarbons, whereas the product of the invention is a C16 and/or C18 dimer. In addition, significant amount, even more than 50%, by FIMS, of mononaphthenes is present in the product of the invention.

In the production method of polyalpha olefins of the prior art, the reaction typically takes place with boron trifluoride catalysts at double bonds at the end of the C10 chain, thus leaving one methylene group (—$CH_2$—) between tertiary carbons (structure 4 in Table 2). In case the oligomerization is performed using a heterogeneous catalyst, the double bonds are shifted from the alpha position, while simultaneously, skeletal isomerization occurs, thus leaving from 1 to 10 methylene groups between tertiary carbons in the typical structure of the base oil obtained (structure 3 in Table 2, e.g. 4 methylene groups). In case oligomerization is carried out using a homogeneous catalyst, skeletal isomerization takes respectively place in the hydrogenation step following oligomerization, and thus C1-C3 side branches are formed next to double bonds in the molecules of structure 4 shown in Table 2. There are mainly alkyl branches in PAO and PIO base oils of the prior art, whereas naphthenic components branched by ring structures are present in the product of the invention, in addition to alkyl branches.

Pour point of the high quality base oil obtained with the process of the invention is at best less than −40° C., and accordingly, the base oil is very suitable for demanding low temperature conditions. The viscosity index of the product may be as high as 125, the product thus being suitable in base oil applications of Group III.

The molecular mass of the product may be adjusted according to carbon number ranges necessary for different applications by adding suitable unsaturated carboxylic acids or olefins to the feedstock. Carboxylic acids having small molecules, or olefins cross-linking or oligomerizing with the fatty acids of triglycerides form short branches on the main hydrocarbon chain of the fatty acid. In case other natural cyclic compounds such as alpha pinene are used as additional components of the feedstock, molecules having ring structures in the side chain within the molecular chain are obtained. One or two additional components are preferably oligomerized in the product. According to the invention, corresponding products taylored with respect to hydrocarbon chain lengths may also be produced from other carboxylic acids and from other bio components with short chains. Lighter branched components from HDO treatment are very suitable as bio diesel components.

The base oil of biological origin according to the invention comprises a branched saturated hydrocarbon product. Said product is produced from biological starting material, said product containing at least 90%, preferably at least 95%, particularly preferably at least 97%, and at best 99% by weight, of saturated hydrocarbons. Moreover, the product of the invention contains more than 20%, but not more than 90%; preferably more than 20%, but not more than 80%; and particularly preferably more than 20%, but not more than 60% of mononaphthenes, based on the FIMS method, and less than 3.0%, preferably less than 1.0%, and particularly preferably less than 0.1% of polycyclic naphthenes by FIMS. In addition, the product of the invention contains up to 20%, preferably up to 10%, and particularly preferably up to 5%, and at best up to 1% by weight of linear paraffins (GC).

For base oils of the invention, the viscosity index is at least 100 and preferably at least 110, and particularly preferably at least 128, as determined by the method of ASTM D 2270.

The product of the invention is branched with carbon-carbon bonds, this structure endowing the product with a very low pour point not more than 0° C., preferably not more than −10° C., and particularly preferably not more than −35° C. (ASTM D 5950).

For base oils or of the invention, having a viscosity KV100 of 4-7 mm²/S, the width of the carbon number range is no more than 9 carbons, preferably no more than 7 carbons, and particularly preferably no more than 3 carbons (determined by field ionization mass spectrometry, FIMS). More than about 50%, preferably more than 75% and particularly preferably more than 90% by weight of the base oil contains hydrocarbons belonging to this narrow carbon number distribution.

Sulfur content of said base oil of the invention is less than 300 ppm, preferably less than 50 ppm, and particularly preferably less than 1 ppm, (ASTM D 3120).

Nitrogen content of said base oil of the invention is less than 100 ppm, preferably less than 10 ppm, and particularly preferably less than 1 ppm, (ASTM D 4629).

Base oils of the invention contains carbon $^{14}C$ isotope, which may be considered as an indication of the use of renewable raw materials. Typical $^{14}C$ isotope content of the product completely of biological origin is at least 100%, determined as the content of radioactive carbon on the basis of radioactive carbon content in the atmosphere in 1950 for a product completely based on biological materials (ASTM D 6866). $^{14}C$ isotope content of the base oil is lower in case other than biological components are used in the processing of the product, said content being, however, more than 50%, preferably more than 90%, particularly preferably more than 99%. In this way, even low amounts of base oil of biological origin may be detected in other types of hydrocarbon base oils.

Volatility of the base oil component with a narrow boiling range, obtained according to the invention, is extremely low compared to similar products of the prior art. For base oil of the invention the volatility of product, having KV100 from 3 cSt to 8 cSt, is no more than $2271.2*(KV100)^{-3.5373}$ % by weight as determined by the method of DIN 51581-2 (Mathematical Noack method based on ASTM D 2887 GC distillation).

The cetane number of the product obtained with the process of the invention, suitable as a diesel component, is more than 40, preferably more than 55, and particularly preferably more than 70. It contains more than 60%, preferably more than 99% by volume, of paraffins, and less than 30%, preferably less than 1% by volume, of aromatics, based on the IP-391 method. The diesel product comprises less than 40%, preferably less than 10%, by weight, of linear n-paraffins. The cloud point of the diesel component is less than 0° C., preferably less than −15° C., and particularly less than −30° C. Typically, the diesel product obtained is totally of biological origin. In the product of the invention, there are branches formed by carbon-carbon bonds, this structure resulting in a very low cloud point. Due to the biological origin, said products of biological origin also contain carbon $^{14}C$ isotope indicating that renewable raw materials are used. $^{14}C$ content of a product of totally biological origin is at least 100%.

Selection of the biological feedstock has a strong influence on the composition and boiling range of the product. Moreover, the feed may be fractioned by distillation to fractions having narrow carbon numbers that may be tailored for different applications. For feedstocks having hydrocarbon chain lengths of C16, C18, C20, and C22, typical carbon numbers of the dimer products are respectively C32, C36, C40, and C44 following hydrodeoxygenation, said carbon numbers being reduced by two to C30, C34, C38, and C42 following decarboxylation/decarbonylation. Since the distillation range of the product mainly depends on the hydrocarbon chain length, narrow product fractions are obtained.

Advantages of the Invention

The process of the invention, and the obtained product have several advantages, including for instance the use of renewable raw materials instead of non-renewable feedstocks for lowering carbon dioxide emissions contributing to the greenhouse effect. A biological starting material containing heteroatoms serves according to the invention as a fully new raw material source for high-quality saturated base oils.

Starting materials of the process of the invention are available all over the world, and moreover, the utilization of the process is not limited by significant initial investments, in contrast for instance to the GTL technology.

The products of the inventive process are carbon dioxide neutral with respect to the use and disposal thereof, that is, they will not increase the carbon dioxide load of the atmosphere, in contrast to products derived from fossil starting materials.

The base oil prepared according to the present invention is hydrolytically more stabile and it has a structure not decomposing under humid conditions, unlike the esters and other base oils containing heteroatoms, such as fatty alcohol dimers. In addition, the oxidation resistance of saturated hydrocarbons is better than that of corresponding base oils containing unsaturated groups on the basis of fatty acid or fatty alcohol dimers, or ester base oils. A saturated hydrocarbon component is not decomposed as easily as esters that form corrosive acids. A nonpolar and saturated hydrocarbon component is obtained using the process of the invention by removing the oxygen of alcohols, esters, or carboxylic acids in the deoxygenation step as well as the heteroatoms of any impurities of the feedstock. Oligomerizing carboxylic acid derivatives yield a structure having branches formed by carbon-carbon bonds following deoxygenation. In C12:1-C20:1 oligomerization, lengths of the obtained branches are typically from C3 to C11. Such hydrocarbons have very low pour points favourable for base oil applications, and thus the product is liquid at very low temperatures, and further, it has a superior viscosity index. The produced saturated hydrocarbon product is a suitable component of base oils without any mixing limitations, and further, it is compatible with lubricant additives.

The base oil of the invention is endowed with superior technical properties compared to conventional hydrocarbon oils of the corresponding viscosity class, particularly in cases where KV100 is from 4 to 7 mm$^2$/s. Narrow boiling range indicates that the product does not contain any initial light fraction, meaning molecules considerably lighter than the average shown as decreased volatility of the product and resulting in reduced emissions in practical applications. The base oil product does not contain heavy distillation "tail" meaning t the molecules considerably heavier than the average, resulting in excellent low temperature properties of the product.

For the base oil of the invention, the carbon number and boiling ranges are governed by the feedstock composition. For base oils of the prior art, the boiling range is adjusted by distilling the product to obtain a fraction having the desired kinematic viscosity. It is preferable for the lubricants to have base oils with narrow carbon numbers and thus narrow boiling ranges, and accordingly, the compositions contain molecules of similar sizes behaving under different conditions in a similar way.

For the base oil or base oil component, high viscosity index of the product indicates that the amount of the viscosity index improver typically used in lubricating compositions may be reduced. It is generally known that for instance in engine oils, the VII component is the main cause for fouling of the engine. In addition, reduction of the amounts of VII results in significant savings in costs.

Compared to conventional base oils derived from crude oil, no sulfur or nitrogen are present in said products. The process based on purified starting materials derived from natural fatty acids allows the safe use of products in such applications where the users are exposed to said oil or vapour of oil. Moreover, response of the product of the invention to antioxidant agents and agents lowering pour point is excellent, thus allowing for the longer use of the lubricants prepared from said base oil, as well as the use thereof under cold weather conditions.

Compared to esters, the base oil of the invention is more compatible with conventional base oil components derived from crude oil and with other hydrocarbon base oils, as well with lubricant additives. Moreover, there are no such problems with elastomers such as sealing materials as encountered for esters.

Advantages of the base oil of the invention include the fact that it complies with the requirements for base oils according to API Group II, preferably Group III, and may be used in compositions of engine oils like other base oils of API Group II or III classification, according to same oil change rules.

The base oil of the invention is derived from renewable natural resources as clearly seen from the $^{14}$C isotope content of the product. $^{14}$C isotope content of the product is at least 100% for products of biological origin, and 0% for products derived from crude oil. Proportion of the base oil component of biological origin may also be determined on the basis of the $^{14}$C isotope content of the base oil with an accuracy of at least 1%.

Low temperature properties and the cetane number of the middle distillate produced by the process of the invention, suitable as a diesel fuel, are also excellent, the middle distillate thus being suitable in demanding low temperature applications.

With the optional prehydrogenation step, side reactions of double bonds such as polymerization, ring formation, and aromatization may be decreased, said side reactions being detrimental to the viscosity properties of the products and causing coke formation on the HDO catalyst.

By means of an optional recycling of the unreacted feedstock components, more reactions of the double bonds may be achieved to improve the product yield.

Instead of or in addition to biological starting materials, synthetic compounds having a corresponding chemical structure may also be used in the invention as the feed.

The properties of the hydrocarbon components produced according to the invention, and described in the following examples are excellent, and moreover, carbon number ranges and distillation ranges are very narrow. The process of the invention provides a molecular structure having superior viscosity properties and excellent low temperature properties. The products are well suited as base oils without blending limitations, and further, the products are also compatible with lubricant additives.

The invention is now illustrated by means of the following examples. The purpose is, however, not to limit the scope thereof to the embodiments described or combinations thereof. The invention may also be carried out otherwise than in the way specifically described without departing from the appended claims.

EXAMPLES

Example 1

Preparation of a Hydrocarbon Component from Plant Oil

Feedstock containing 200 ml of soybean oil, 6 g of montmorillonite catalyst, and 5 ml of distilled water, was loaded in high pressure Parr reactor. The temperature was increased to 270° C. and the oil was allowed to oligomerize while slowly mixing for 7 hours.

Thereafter, in the HDO step, the mixture oligomerized above was hydrogenated in the high pressure Parr reactor using dried and activated NiMo/Al$_2$O$_3$ catalyst to yield i-paraffin. 200 ml of oligomerized soy oil mixture was hydrogenated at 325° C., under a hydrogen pressure of 5 MPa, until no acid groups were detected in the FTIR spectrum of the sample. The reaction mixture was mixed at 300 rpm. The final product was distilled, and mainly branched and cyclic C36 paraffin was obtained as the product.

The properties of the hydrocarbon component obtained are shown in Table 3. Hydrocarbon components may also be produced in a similar manner from other plant and fish oils and animal fats comprising double bonds.

Example 2

Preparation of a Hydrocarbon Component from Methyl Esters of Carboxylic Acids Derived from Soybean Oil Soybean oil was pretreated by transesterification with methanol under basic conditions, at temperature of 70° C. under a pressure of 0.1 MPa in the presence of a sodium methoxide catalyst in two steps. Methyl esters of carboxylic acids were purified by washing with an acid and water, and then they were dried. The carboxylic acid composition of the methyl ester derived from soybean oil was as follows: C16:0, 11%; C18:2, 20%; C18:1, 8%; C18:2, 54%; and C18:3, 6%.

The carboxylic acid methyl ester mixture obtained above was oligomerized in a high pressure Parr reactor. 200 ml of the feedstock and 6 g of bentonite catalyst were introduced into the reactor, the reactor was pressurized with nitrogen twice to displace oxygen, then the temperature was increased to 350° C., and the carboxylic acid methyl ester mixture was allowed to oligomerize while slowly mixing for 7.2 hours. Monomeric, dimeric, and trimeric methyl esters were separated from the reaction mixture using a silica column.

Then, the dimeric and the trimeric methyl esters obtained above were respectively hydrogenated as described in example 1, and the final product was distilled, thus yielding 26%, by weight, of branched and cyclic C36 paraffin, and 15%, by weight, of branched and cyclic C54 paraffin.

The properties of the hydrocarbon component obtained are presented in Table 3. The properties of the product are excellent, the molecular distribution being very narrow. Hydrocarbon components may also be produced in a similar manner from other methyl esters of carboxylic acids of plant, fish or animal origin comprising several double bonds. The yield of the process may be improved by recycling the unreacted monomers.

Example 3

Preparation of a Hydrocarbon Component from Carboxylic Acids Derived from Tall Oil In the pretreatment step, free carboxylic acids of tall oil were distilled. Thereafter, the carboxylic acids were oligomerized in a high pressure Parr reactor. 200 g of the feedstock (carboxylic acids), 16 g of montmorillonite catalyst, and 10 g of water were introduced into the reactor. The temperature was increased to 255° C., and the carboxylic acids were allowed to oligomerize while slowly mixing for 3 hours. The mixture was cooled, and the catalyst was filtered off. Monomers were separated from the dimers and trimers (acids) of the reaction mixture using a silica column. The yield of the carboxylic acid dimer was 45%, by weight.

In the HDO step, the fraction containing dimers was hydrogenated as in Example 1 until no carboxylic acid peak was present in the FTIR spectrum. Both branched and cyclic paraffins were obtained as the product.

The properties of the hydrocarbon component obtained are presented in Table 3. Hydrocarbon components may also be produced in a similar manner from free carboxylic acids derived from other oils than from tall oil, or from hydrolysed carboxylic acids of plant or fish oil, or animal fats, said acids comprising double bonds.

Example 4

Preparation of a Hydrocarbon Component from Carboxylic Acids Derived from Tall Oil, Utilizing Prehydrogenation In the pretreatment step, free carboxylic acids of tall oil were distilled. Then, the feedstock comprised 30% of C18:1, 42% of C18:2, and 9% of C18:3 carboxylic acids, by weight. In addition, the feedstock contained 2% of resin acids. The carboxylic acids of tall oil were oligomerized in a high pressure Parr reactor. 200 g of the feed mixture, 16 g of a montmorillonite catalyst, and 10 g of water were loaded into a reactor. For the displacement of oxygen, the nitrogen pressure was increased to 0.5 MPa, and the mixture was stirred at 600 rmp for a moment. Pressure was released, and the pressurization with nitrogen was repeated. Then the temperature was increased to 225° C., and the carboxylic acids were allowed to oligomerize while slowly mixing for 2 hours. The product was cooled, and the catalyst was filtered off. Monomers, dimers, and trimers (acids) were separated from the reaction mixture using a silica column. The yield of the carboxylic acid dimer was 45%, by weight.

Prior to HDO step, the double bonds of the dimers obtained above were hydrogenated using a presulfurized NiMo/Al$_2$O$_3$ catalyst in a high pressure Parr reactor of 450 ml. Prehydrogenation was performed using a dried and activated catalyst at 230° C., under a hydrogen pressure of 5 MPa while mixing at 300 rpm. Hydrogenation of the dimers was continued until no double bonds were seen in the FTIR spectrum.

The dimers was hydrogenated in the HDO step as in Example 1, until the carboxylic acid peak was disappeared from the FTIR spectrum, followed by filtering of the paraffinic product kieselguhr. Both branched and cyclic C34, C35, C36 paraffins were obtained as the final products.

The properties of the hydrocarbon component obtained are presented in Table 3. The properties of the hydrocarbon component are excellent, the molecular distribution being very narrow. Hydrocarbon components may also be produced in a similar manner from free carboxylic acids derived from other oils than from tall oil, or from hydrolysed carboxylic acids of plant or fish oil, or animal fats, said acids comprising double bonds.

Example 5

Preparation of a Hydrocarbon Component from Methyl Esters of Carboxylic Acids Derived from Soybean Oil, and Alpha Pinene Soybean oil was transesterified with methanol as in Example 2, thus yielding methyl esters of carboxylic acids. The reaction mixture was purified by washing with an acid and water. Finally, the carboxylic acid methyl ester was dried. The carboxylic acid composition of the methyl ester was as follows: C16:0, 11%; C18:0, 20%; C18:1, 8%; C18:2, 54%; and C18:3, 6%.

The soybean oil methyl ester obtained above was oligomerized with alpha pinene, the molecular ration being 2:1 respectively, in a high-pressure Parr reactor using 8% of a bentonite catalyst, and 4% of water. 200 ml of the feedstock mixture was loaded into the reactor. The displacement of oxygen was done as in example 4. The temperature and the pressure were respectively increased to 310° C., and 2 MPa, and the soybean oil methyl ester was allowed to oligomerize with alpha pinene while slowly mixing for 6 hours.

The oligomerized product was subjected to hydrodeoxygenation as described in Example 1. Monomers were separated from the final product by distillation, thus giving "pinene branched" C28 isoparaffin, and a mixture of paraffinic dimers and trimers from carboxylic acid methyl ester. The properties of the hydrocarbon component obtained as the product are presented in Table 3. Branched hydrocarbon components may also be produced in a similar manner from other carboxylic acids of plant, animal or fish origin, or fats, said acids comprising several double bonds, or methyl esters of carboxylic acids and suitable compounds with small molecular sizes, preferably of biological origin.

Example 6

Preparation of a Heavy Hydrocarbon Component from Carboxylic Acids of Tall Oil Tall oil was oligomerized as in Example 3, with the exception that the reaction was carried out while slowly mixing for 7 hours. The trimers were separated from the dimers and monomers of the reaction mixture using a silica column.

The trimers obtained above were hydrogenated in a HDO step as in Example 1 until no carboxylic acid peak was present in the FTIR spectrum. Both branched and cyclic paraffin was obtained as the product. The properties of the product are shown in Table 3. Hydrocarbon components may also be produced in a similar manner from free carboxylic acids derived from other oils than from tall oil, or from hydrolysed carboxylic acids of plant or fish oil, or animal fats, said acids comprising double bonds.

TABLE 3

Properties of the processed hydrocarbon components

| Analysis | Ex. 1 | Ex. 2 | Ex. 3 | Ex. 4 | Ex. 5 | Ex. 6 | Method |
|---|---|---|---|---|---|---|---|
| KV100 (mm2/s) | 5.2 | 6.0 | 5.6 | 6.6 | 5.4 | 25.1 | ASTM D445 |
| KV40 (mm2/s) | 28.9 | 35.8 | 32.0 | 38.0 | 31.8 | 248.4 | ASTM D445 |
| VI (-) | 113 | 111 | 113 | 129 | 104 | 129 | ASTM D2270 |
| Pour point (° C.) | −9 | −12 | −57 | −39 | 0 | −9 | ASTM D5950 |
| GC distillation (° C.) | | | | | | | ASTM D2887 |
| 5% | | | 394 | 398 | 380 | 335 | |
| 50% | | | 458 | 469 | 427 | 478 | |
| 95% | | | 482 | 626 | 495 | 647 | |
| GC-Noack, % by weight | | | 6.7 | 5.7 | | | DIN51581-2 |
| Molecular distribution, wt-% | | | | | | | |
| aromatics | | | | 0.0 | | | ASTM D2549 |
| n-paraffins | | | | <1 | | | GC |
| i-parafines | | | | 28 | | | FIMS |
| Mononaphthenes | | | | 57 | | | FIMS |
| Dinaphthenes | | | | 15 | | | FIMS |
| other naphthenes | | | | 0 | | | FIMS |
| sulfur, ppm | | | | <1 | | | ASTM D3120/D4294 |
| nitrogen, ppm | | | | 1.5 | | | ASTM D4629 |
| $^{14}$C, % modern carbon | | | | 100 | | | |

TABLE 4

Properties of base oils of the prior art

| Analysis | API GpIII HC-CDW | API GpIII HC-CDW | API GpIII SW | API GpIV PAO | Method |
|---|---|---|---|---|---|
| KV100 (mm$^2$/s) | 4.29 | 6.00 | 4.0 | 5.7 | ASTM D445 |
| KV40 (mm$^2$/s) | 20.0 | 33.1 | 16.8 | 30 | ASTM D445 |
| VI, ( ) | 122 | 128 | 140 | 135 | ASTM D2270 |
| Pour point (° C.) | −18 | −12 | −21 | <−63 | ASTM D5950 |
| GC-distillation (° C.) | | | | | |
| 5% | 388 | 404 | 388 | | |
| 50% | 421 | 459 | 421 | | |
| 95% | 469 | 533 | 485 | | |
| GC-Noack, p-% | 13.3 | 5.8 | | | DIN 51581-2 |
| Molecular distribution wt-% | | | | | |
| Aromatics | 0.0 | 0.0 | 0.0 | 0.0 | ASTM D2549 |
| Paraffins | 37.0 | 26.8 | 72.4 | 100 | FIMS |
| Mononaphthenes | 37.3 | 39.3 | 23.9 | 0.0 | FIMS |
| Dinaphthenes | 16.1 | 20.3 | 3.5 | 0.0 | FIMS |
| Other naphthenes | 9.8 | 13.6 | 0.2 | 0.0 | FIMS |

TABLE 4-continued

Properties of base oils of the prior art

| Analysis | API GpIII HC-CDW | API GpIII HC-CDW | API GpIII SW | API GpIV PAO | Method |
|---|---|---|---|---|---|
| Sulfur, ppm | <0.2 | <0.2 | | <1 | ASTM D3120/D 4294 |
| Nitrogen, ppm | <1 | <1 | | <1 | ASTM D4629 |
| $^{14}$C % modern carbon | | 0 | | | ASTM D6866 |

HC-CDW = hydrocracked, wax isomerized base oil

Example 7

Demonstration of the Biological Origin of the Hydrocarbon Component

Hydrocarbon component of biological origin from example 6 was weighed into a base oil derived from mineral oil of the Group III, and mixed thoroughly. For the first sample, 0.5014 g of the hydrocarbon component of biological origin was weighed, and base oil component of the Group II was added in an amount to obtain a total weight of 10.0 g; for the second sample, 1.0137 g of the hydrocarbon component of biological origin was weighed, and base oil component of the Group II was added in an amount to obtain a total weight of 10.0232 g. The measured results are in Table 5, below. The results are expressed as "percent modern carbon", based on the content of radioactive carbon of the atmosphere in 1950. At present, percentage of modern carbon in the atmosphere is about 107%. $\delta^{13}$ C value shows the ratio of stable carbon isotopes $^{13}$C/$^{12}$C. By means of this value, the isotope fractionation taking place in the sample treatment process may be corrected. Actual results are presented in the last column. Method is ASTM D6866.

TABLE 5

Radioactive carbon results

| Sample | $^{14}$C content, % | $\delta^{13}$ C | Percent modern carbon, % |
|---|---|---|---|
| Mineral oil | 0.1 ± 0.07 | −29.4 | 0 |
| Bio oil | 106.7 ± 0.4 | −28.9 | 100 |
| Mineral oil + bio, 5%, by weight | 5.0 ± 0.3 | −29.3 | 4.60 ± 0.28 |
| Mineral oil + bio, 10%, by weight | 10.8 ± 0.3 | −29.6 | 10.04 ± 0.29 |

Example 8

Carbon Number Distribution

Figure 2:
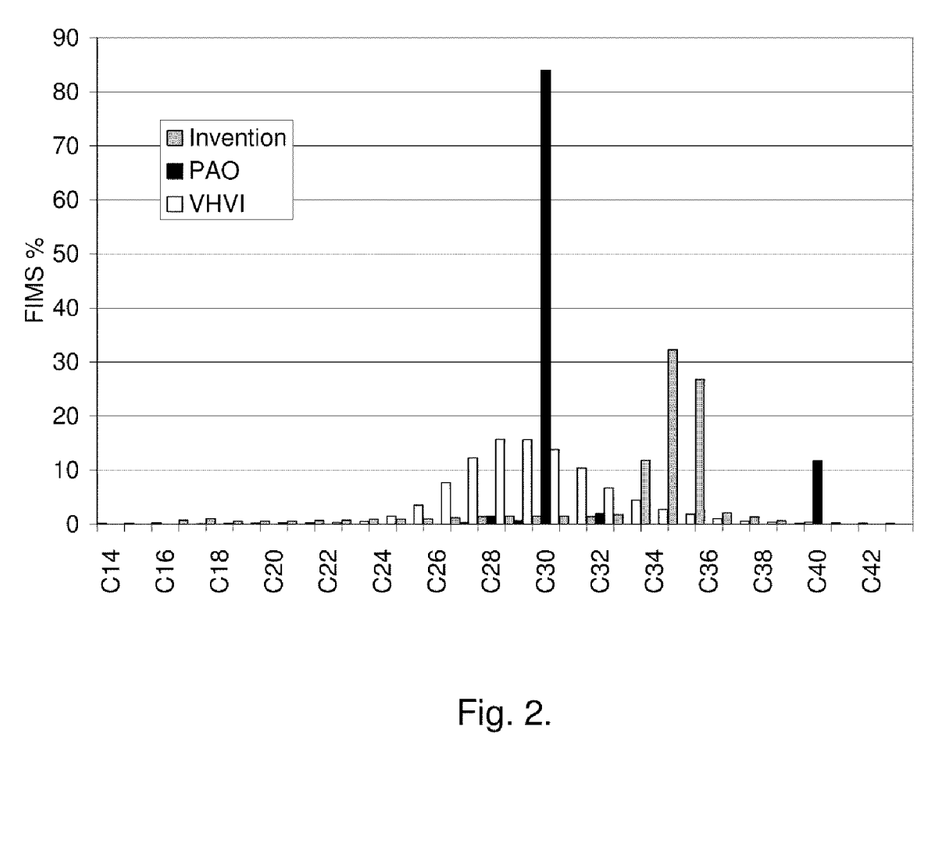
FIG. 2 shows a graph which demonstrates that the baseoils of the invention contain higher amount of higher boiling C34-C36 fractions compared to the conventional products of same viscosity range (KV100 about 4 cSt).

The carbon number distribution of the base oils according to invention is described narrower than that of conventional base oils. The baseoils of the invention contain higher amount of higher boiling C34-C36 fractions compared to the conventional products of same viscosity range (KV100 about 4 cSt), as shown in FIG. 2. The carbon number distribution is determined by FIMS. The sample of FIMS analysis is that of example 4 with C18 tall oil fatty acid feed. In addition to hydrodeoxygenation to produce C36 compounds, also decarboxylation/decarbonylation lead to paraffinic C35/C34 compounds (combined HDO-decarboxylation/decarbonylation).

The invention claimed is:

1. Process for producing a saturated hydrocarbon component, characterized in that feedstock comprising one or more component(s) selected from the group consisting of carboxylic acids having carbon numbers from C4 to C38, esters of C4 to C38 carboxylic acids and C1-C11 alcohols, C4-C38 carboxylic acid anhydrides, and C4-C38 alcohols is oligomerized in the presence of a cationic clay catalyst or a zeolite catalyst and deoxygenized to produce a saturated hydrocarbon component, said feedstock containing at least 50% by weight of unsaturated and/or polyunsaturated compounds.

2. Process according to claim 1, characterized in that the feedstock comprises one or more component(s) selected from the group consisting of carboxylic acids having carbon numbers from C4 to C24, esters of C12 to C24 carboxylic acids and C1-C3 alcohols, C12-C24 carboxylic acid anhydrides and C12-C24 alcohols.

3. Process according to claim 1 or 2, characterized in that the feedstock comprises at least one starting material of biological origin, selected from the group consisting of triglycerides, fatty acids, esters of fatty acids and alcohols, fatty acid anhydrides, and fatty alcohols.

4. Process according to claim 3, characterized in that the starting material is selected from the group consisting of:
a) plant fats, plant oils, plant waxes; animal fats, animal oils, animal waxes; fish fats, fish oils, fish waxes, and mixtures thereof, and
b) free fatty acids or fatty acids obtained by hydrolysis, acid transesterification or pyrolysis reactions from plant fats, plant oils, plant waxes, animal fats, animal oils, animal waxes, fish fats, fish oils, fish waxes, and mixtures thereof, and
c) esters obtained by transesterification from plant fats, plant oils, plant waxes, animal fats, animal oils, animal waxes, fish fats, fish oils, fish waxes, and mixtures thereof, and
d) esters obtained by esterification of free fatty acids of plant, animal and fish origin with alcohols, and mixtures thereof, and
e) fatty alcohols obtained as reduction products of fatty acids from plant fats, plant oils, plant waxes, animal fats, animal oils, animal waxes, fish fats, fish oils, fish waxes, and mixtures thereof, and
f) waste and recycled food grade fats and oils, and fats, oils and waxes obtained by genetic engineering, and mixtures thereof, and
g) mixtures of said starting materials.

5. Process according to claim 1, characterized in that the feedstock contains at least 80% by weight of unsaturated and/or polyunsaturated compounds.

6. Process according to claim 1, characterized in that the oligomerization is carried out under a pressure from 0 to 10 MPa, and at a temperature from 100 to 500° C.

7. Process according to claim 1, characterized in that up to 10%, by weight of water is added to the feedstock containing carboxylic acids in the oligomerization step.

8. Process according to claim 1, characterized in that the deoxygenation is carried out as hydrodeoxygenation or as decarbonylation/decarboxylation, the deoxygenation being carried out prior to, or following oligomerization.

9. Process according to claim 8, characterized in that the hydrodeoxygenation is carried out in the presence of hydrogen, at a temperature between 100 and 500° C., under a pressure between 0 and 20 MPa, the flow rate WHSV being between 0.1 and 10 l/h, in the presence of a hydrodeoxygenation catalyst.

10. Process according to claim 8 or 9, characterized in that the hydrodeoxygenation catalyst is a Pd, Pt, Ni, NiMo or CoMo catalyst having an alumina and/or silica support.

11. Process according to claim 8, characterized in that prior to hydrodeoxygenation, the product from the oligomerization step is subjected to prehydrogenation in the presence of a catalyst, at a temperature between 50 and 400° C., under a hydrogen pressure between 0.1 and 20 MPa, the flow rate WHSV being between 0.1 and 10 l/h.

12. Process according to claim 11, characterized in that the prehydrogenation reaction catalyst is a Pd, Pt, Ni, NiMo or CoMo catalyst having an alumina and/or silica support.

13. Process according to claim 8, characterized in that the feedstock of the process, or the product of the oligomerization step is subjected to decarboxylation/decarbonylation in the presence of a decarboxylation/decarbonylation catalyst, at a temperature between 200 and 400° C., pressure between 0 and 20 MPa, the flow rate WHSH being between 0.1 and 10 l/h.

14. Process according to claim 11, characterized in that the decarboxylation/decarbonylation catalyst is a Pd, Pt, Ni, NiMo or CoMo catalyst having an alumina and/or silica support or an activated carbon support.

15. Process according to claim 1, characterized in that following the oligomerization and deoxygenation steps, the product is subjected to isomerization in the presence of hydrogen gas under a pressure between 0.1 and 20 MPa, at a temperature between 100 and 500° C., in the presence of an isomerization catalyst.

16. Process according to claim 15, characterized in that the isomerization catalyst is a supported catalyst containing a molecular sieve and a metal of the Group VIII of the periodic table of the elements.

17. The process according to claim 7, wherein from 0.1 to 4% by weight of water is added to the feedstock.

\* \* \* \* \*